United States Patent
Bahm

[11] Patent Number: 5,527,587
[45] Date of Patent: Jun. 18, 1996

[54] TRIM PIECE AND METHOD FOR MAKING SAME

[75] Inventor: Jackson Bahm, Bloomfield Hills, Mich.

[73] Assignee: Top Source Technologies, Inc., Palm Beach Garden, Fla.

[21] Appl. No.: 299,565

[22] Filed: Sep. 1, 1994

[51] Int. Cl.⁶ ................... B32B 3/00; B60J 7/00; B29C 63/00
[52] U.S. Cl. .......... 428/172; 428/192; 428/213; 428/284; 296/214; 264/167; 264/241; 264/257; 156/212; 156/213; 156/244.25; 52/312
[58] Field of Search ............ 428/172, 192, 428/68, 74, 95, 190, 213, 284; 156/212, 267, 213, 244.25; 264/248, 257, 167, 241; 296/214; 52/312

[56] References Cited

U.S. PATENT DOCUMENTS 4,734,147  3/1988  Moore ..................... 156/212
4,781,956  11/1988  Zimmerman et al. ........... 428/172
5,418,032  5/1995  Martin ..................... 428/192

Primary Examiner—Donald J. Loney
Attorney, Agent, or Firm—Howard & Howard

[57] ABSTRACT

A trim piece (10) includes a body shape (30) and mold edge (34). A fabric cover (28) covers the body (30). An indent (38) extends along the periphery of the trim piece (10) just below the mold edge (34). A movable die part (56) forces additional fabric (40) into the indent (38) during the mold process. The excess fabric (40) is in tension when the movable die part (56) is retracted but the excess fabric (40) relieves the tension between the indent (38) and the mold edge (34) eliminating the tendency of the fabric cloth (28) to pull back or creep back from the mold edge (34) or the resulting cut line.

5 Claims, 2 Drawing Sheets

TRIM PIECE AND METHOD FOR MAKING SAME

BACKGROUND OF THE INVENTION

1. Technical Field

The subject invention relates to mold parts. More specifically, the subject invention relates to the fabrication of mold parts including fabric coverings.

2. Description of Related Art

Molding interior trim parts of automobiles is increasingly becoming a task out sourced by the automotive companies. Parts which are capable of being installed quickly into substantially built automobiles help the efficiency requirements of the automotive companies as long as the quality of the completed automobile can be maintained. One such problematic area is the disjoint or discontinuous look of trim parts where by abut other trim parts.

A simple, yet undesirable solution to this problem requires fabric wrap-around for at least one of the adjacent trim parts. The fabric wrapped around the trim part insures no plastic or polyurethane mold part exposure. The solution creates problems while solving the unsightly part exposure problem. Mainly, the additional fabric needed to wrap around the edges of the trim part costs additional money and reduces the value of the tolerance requirements.

U.S. Pat. No. 4,734,147, issued to Moore on Mar. 29, 1988, discloses a method of precisely attaching a fabric end to the end of a trim part. The fabric is dielectrically bonded to the rigid support member of the trim part. A layer of foam is secure between the fabric cover and the rigid support member allowing the fabric cover the ability to maintain the exact edge with the rigid support member because the foam can expand or contract according to the expansions or contractions of the fabric cover. The dielectric bonding system is costly to maintain and operate. Additionally, this system will not work with the absence of an intermediate foam layer because the fabric may be stretched to the point where it will break the bond created dielectrically.

SUMMARY OF THE INVENTION AND ADVANTAGES

A trim article comprises a layer of fabric cloth defining a fabric periphery and a rigid member molded to a defined shape defining a mold edge. The layer of fabric cloth is bonded to the rigid member. The trim article is characterized by an indent extending along the mold edge for reducing tension in the fabric cloth at the fabric periphery preventing the fabric periphery from pulling away from the mold edge.

The advantages associated with the subject invention include a low cost method for manufacturing a foamless trim product having a fabric cover which periphery does not creep or pull back away from the trim edge exposing the rigid member to passengers in the automobile.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
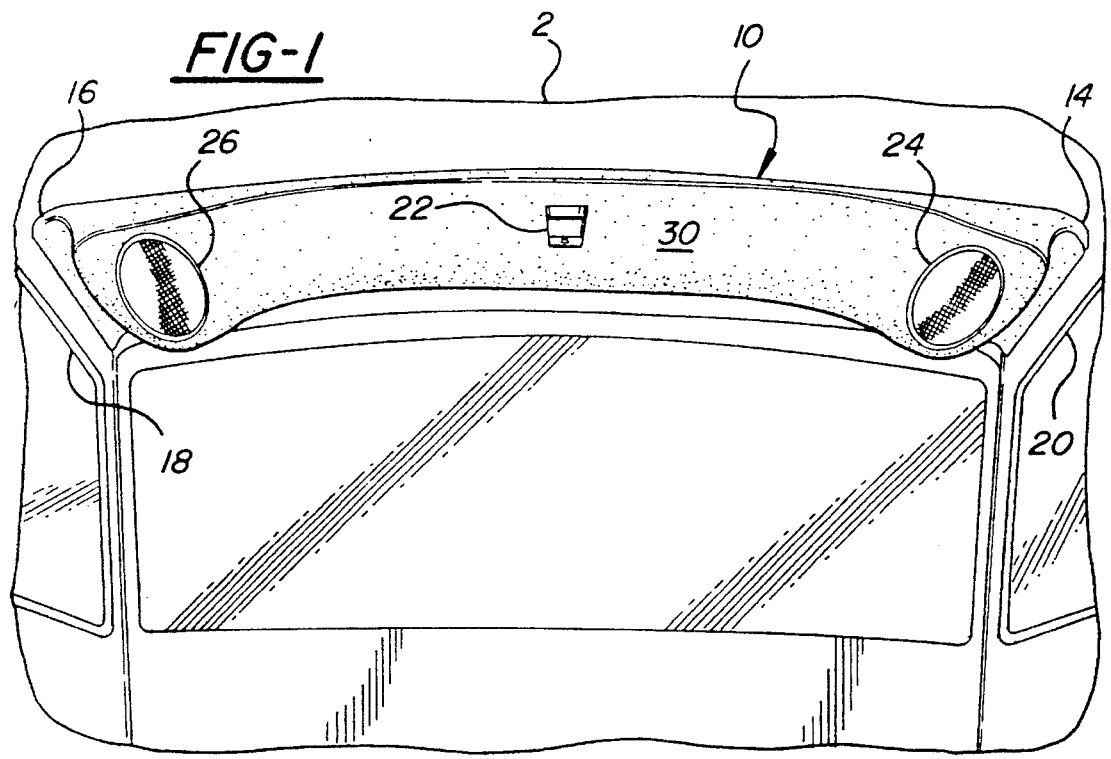
FIG. 1 is a cut away perspective view of the subject invention in the environment of an automobile.
Figure 2:
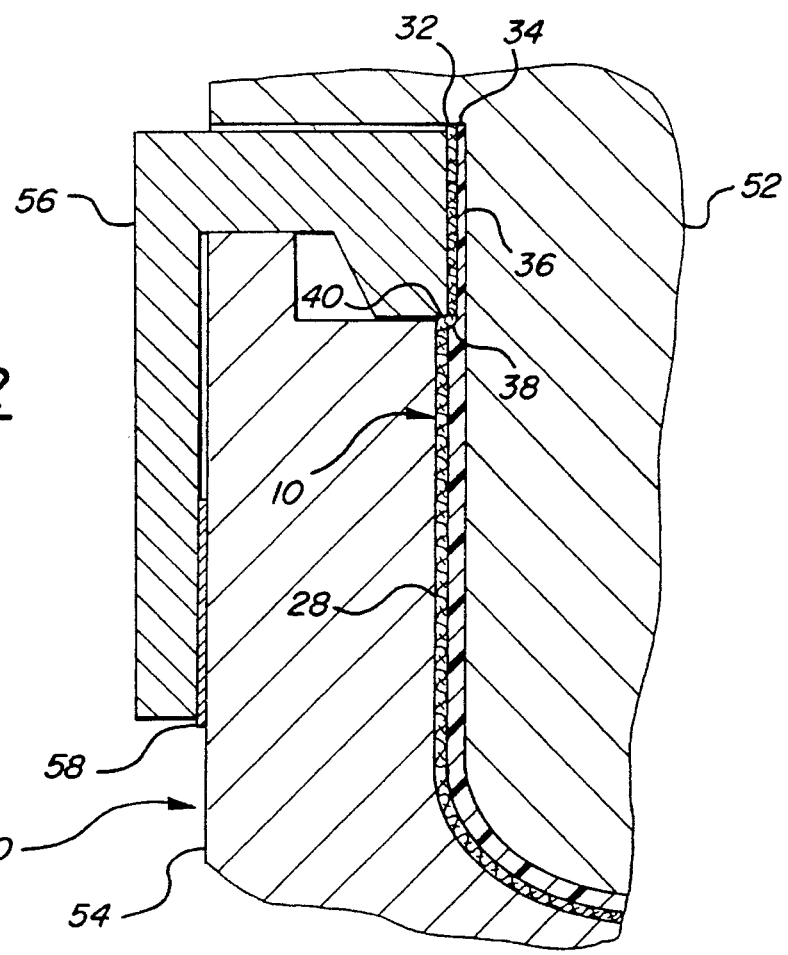
FIG. 2 is a partially cut away cross section of the mold assembly and mold part located therein.
Figure 3:
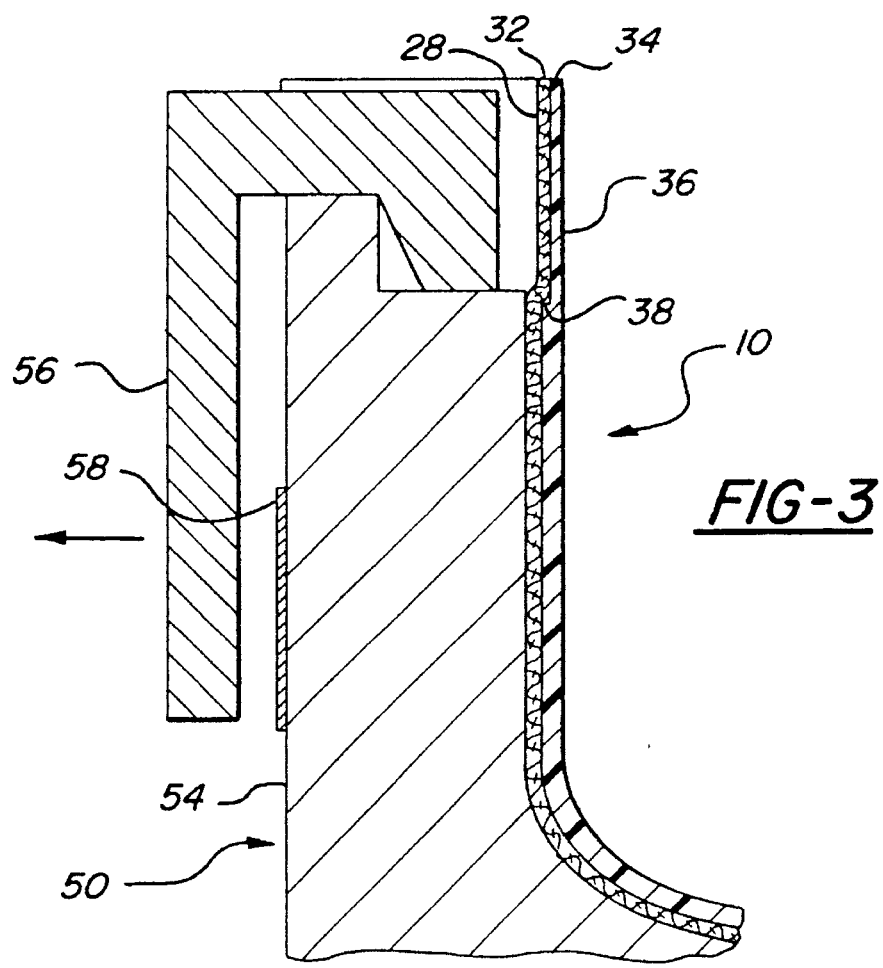
FIG. 3 is a partially cut away cross sectional view of the movable mold member releasing the mold part from the lower die part.

A trim article is generally shown at 10 in the Figures. As an example, the trim article 10 is fitted into a vehicle 12 by sliding the ends 14, 16 of the trim article into the existing trim 18, 20 of the vehicle 12. In the example shown in FIG. 1, additional securing means, i.e., pop rivets, screws and the like, may be inserted through the trim article 10 into the vehicle structure 12 at inconspicuous points, such as the dome light 22. Further, two speakers 24, 26 are supported by the trim article 10. A nonexhaustive list of types of components which may be supported by a trim article 10 include, but are not limited to, ashtrays, door handles, hooks, vents and control buttons.

The trim article 10 includes a layer of fabric cloth 28 which covers the body 30 of the trim article 10. The fabric cloth 28 defines a fabric periphery 32 which extends around the entire trim article 10. Although represented in the Figures, the fabric periphery 32 does not have to be coextensive with the mold edge 34 (discussed subsequently). In the preferred embodiment, the layer of fabric cloth 28 includes a foam layer (not shown) covered by a barrier impervious to liquid urethane. Vacuflax™ is used in the preferred embodiment as the barrier.

A rigid member 36 is molded to define a shape or body 30 having a mold edge 34. The layer of fabricated cloth 28 is bonded to the rigid member 36. In the preferred embodiment, it is fabricated from a polyurethane. However, any molding substance known to those skilled in the art as suitable for such a mold process may be used.

The trim article 10 is characterized by an indent 38 which extends along the mold edge 34 for reducing the tension in the layer of fabric 28 between the indent 38 and the fabric periphery 32. The indent 38 prevents the fabric periphery 32 from pulling away from the mold edge 34 by maximizing the amount of fabric cover 28 located at the indent 38. The indent 38 comprises a shoulder which receives a portion of the layer of fabric cloth 28 thereon. More specifically, because the fabric cloth 28 is being stretched in a three dimensional fashion, the fabric cloth 28 tends to recoil or shrink back along the rigid member 36 attempting to eliminate tension resulting from the molding process. By placing excess fabric 40 near the resulting mold edge 54, the fabric cover between the indent 38 and the mold edge 34 is in a state of reduced tension minimizing the tendency to creep back from the mold edge 34.

The fabric cloth 28 has a defined edge width 42 at the mold edge 34. The fabric cloth 28 further includes a body width 44 located outside the indent 38 which is equal to the defined edge width 42. The fabric cloth 28 does, however, have a defined indent width or thickness 46, located at the indent 28 which is greater than the defined body width 44 and the defined edge width 42. In other words, the fabric cloth 28 at the indent 38 expands to fill the void created by the indent 38.

The method is disclosed for fabricating the molded part 10 having a fabric cover or cloth 28 coextensive therewith using a mold assembly generally indicated at 50. The mold assembly 50 includes an upper die part 52, a lower die part 54 and at least one movable die part 56. The movable die part 56 acts as a slide and is moved laterally with respect to the lower die 54 and the upper die 52. The movable die part 56 is moved with air cylinders (not shown) or any other hydraulic system or mechanism. Shims 58 help space the movable die part 56 with respect to the lower die part 54.

The method for fabricating the molded part 10 includes the steps of laying the fabric cover 28 on the lower die part 54. Although not shown, the fabric cover 28 is secured across the lower die part 54 with clamps to ensure the mold process occurs without wrinkling the fabric cloth 28. A sheet of fiberglass (not shown) is laid across the fabric cover 28. A fluid, polyurethane in the preferred embodiment, is poured through the sheet of fiberglass and onto the fabric cover 28. The sheet of fiberglass acts as a skeletal structure for the polyurethane allowing the molded polyurethane to maintain a defined shape or body 30. It will be obvious to those skilled in the art that the sheet of fiberglass is not necessary if the fluid used does not require a skeletal structure during the setting and curing steps.

The upper die part 52 is lowered onto the lower die 54 part to create a mold space located therebetween. The movable die part 56 is moved into the mold space to form a protrusion in the mold space. The movable die part 56 is moved from a retracted position to an engaging position adjacent the upper 52 and lower 54 die parts.

Once the upper 52 and movable 56 die parts are in the closed position, the polyurethane is set, thus creating a mold part having an indent 38 created by the protrusion of the movable die part 56.

Either before or after the mold part 10 has cured, the movable die part 56 is moved (arrow A) to a retracted position spaced away from the mold space. The upper die part 52 is lifted away from the mold part 10 and the lower die part 54. The mold part 10 is removed thereafter.

Figure 4:
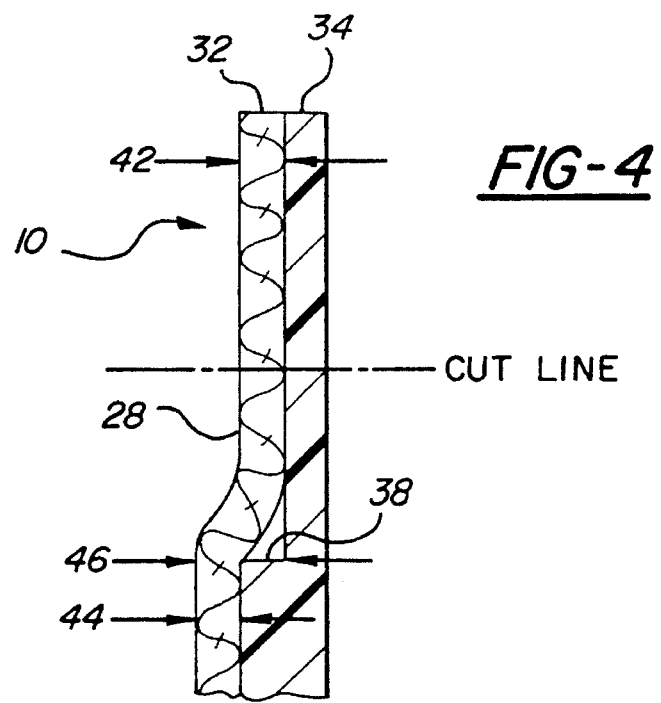
FIG. 4 is a partially cut away cross sectional view of the edge of the mold part.

The mold part is then trimmed between the indent 38 and the edge 34 of the mold part 10. The trimming, along the cut line, shown in FIG. 4, must be made above the indent 38 and below the mold edge 34 because it is there that the fabric cloth 28 is in the reduced tension state. If the cut line is made below the indent 38, i.e., not between the indent 38 and the mold edge 34, the fabric cloth 28 at that location will be in a higher tensioned state and will creep away from the resulting cut made on the molded rigid member 36 resulting in an aesthetically unpleasing part. Further, the cut line must occur where the fabric cloth 28 has a reduced thickness, i.e., somewhat above the indent 38 and not directly thereat.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A trim article (10) comprising:

a layer of fabric cloth (28) defining a fabric periphery (32);

a rigid member (36) molded to a defined shape (30) defining a mold edge (34), said trim article (10) characterized by a shoulder (38) extending along said rigid member (36) in spaced relationship to said mold edge (34), said layer of fabric cloth (28) bonded directly to said rigid member (36) and extending over said shoulder (38) with an increased thickness (46) at said shoulder (38) for reducing tension in said layer of fabric cloth (28) at said fabric periphery (32) to prevent said fabric periphery (32) from pulling away from said mold edge (34).

2. A trim article (10) as set forth in claim 1 further characterized by said layer of fabric cloth (28) having a defined edge width (42) at said mold edge (34).

3. A trim article (10) as set forth in claim 2 further characterized by said layer fabric cloth (28) having a defined body width (44) outside said shoulder (38) equal to said defined edge width (42).

4. A method for fabricating a trim article (10) comprising the steps of:

forming a rigid member (36) of a defined shape having an edge (34) and a shoulder (38) spaced from the edge (34); and bonding a layer of fabric cloth (28) directly to the rigid member (36) and extending over the shoulder with an increased thickness at the shoulder (38) for preventing the fabric from pulling away from the edge (34) of the rigid member (36).

5. A method as set forth in claim 4 further characterized by trimming the article (10) by cutting the fabric cloth (28) and rigid member (36) along a cut line disposed between the shoulder (38) and the edge (34) of the rigid member (36).

\* \* \* \* \*